United States Patent

Henderson

[11] Patent Number: 5,897,603
[45] Date of Patent: Apr. 27, 1999

[54] METHOD FOR DETERMINING THE RELATIONSHIP BETWEEN THE HEADING OF A MACHINE AND THE COURSE OF MACHINE TRAVEL

[75] Inventor: Daniel E. Henderson, Washington, Ill.

[73] Assignee: Caterpillar Inc., Peoria, Ill.

[21] Appl. No.: 08/880,597

[22] Filed: Jun. 23, 1997

[51] Int. Cl.⁶ .................................................. G06F 165/00
[52] U.S. Cl. .................... 701/207; 701/202; 701/50; 701/26; 701/210; 340/988; 340/990
[58] Field of Search ............................ 701/26, 202, 207, 701/210, 214, 216, 213, 217, 25, 50; 340/988, 990, 995; 342/357; 364/142, 144, 474.26, 474.29, 474.36

[56] References Cited

U.S. PATENT DOCUMENTS

| | | | |
|---|---|---|---|
| 4,642,776 | 2/1987 | Matsumoto et al. | 701/210 |
| 4,791,574 | 12/1988 | Thoone et al. | 364/457 |
| 4,807,131 | 2/1989 | Clegg | 701/50 |
| 4,812,991 | 3/1989 | Hatch | 701/225 |
| 4,847,769 | 7/1989 | Reeve | 364/424.02 |
| 5,058,023 | 10/1991 | Kozikaro | 701/217 |
| 5,184,303 | 2/1993 | Link | 701/210 |
| 5,430,654 | 7/1995 | Kyrtsos et al. | 701/215 |
| 5,471,391 | 11/1995 | Gudat et al. | 701/50 |
| 5,493,494 | 2/1996 | Henderson | 364/424.07 |
| 5,546,093 | 8/1996 | Gudat et al. | 342/357 |
| 5,806,016 | 9/1998 | Henderson et al. | 701/50 |

FOREIGN PATENT DOCUMENTS

| | | |
|---|---|---|
| 268278 | 5/1988 | European Pat. Off. . |
| 0496538A2 | 7/1992 | European Pat. Off. . |
| 572129 | 12/1993 | European Pat. Off. . |
| 2169725 | 7/1986 | United Kingdom . |
| 2298539 | 9/1996 | United Kingdom . |
| 2311607 | 10/1997 | United Kingdom . |

*Primary Examiner*—William A. Cuchlinski, Jr.
*Assistant Examiner*—Gertrude Arthur
*Attorney, Agent, or Firm*—W. Bryan McPherson; David M. Masterson

[57] ABSTRACT

A method for determining the relationship between the heading of a machine and the course of machine travel is provided. The method includes the steps of determining a previous and current course of machine travel, and a current and filtered heading. An indicator is used to represent the relationship between the heading of the machine and the course of machine travel. The previous and current course of machine travel are compared and the indicator is responsively updated. The current and filtered heading are compared and the indicator is again responsively updated, and then the filtered heading is updated.

14 Claims, 7 Drawing Sheets

Fig_1_

Fig_2_

Fig_9_

METHOD FOR DETERMINING THE RELATIONSHIP BETWEEN THE HEADING OF A MACHINE AND THE COURSE OF MACHINE TRAVEL

DESCRIPTION

1. Technical Field

The present invention relates generally to earthmoving machines, and more particularly, to a method for automatically determining the relationship between the heading of a machine and the course of machine travel.

2. Background Art

Computer-based aids for earthmoving machines are becoming more common. For example, systems are being developed which utilize the Global Positioning System (GPS) satellites for determining the position of the machine and even the position of an earthmoving tool.

Other systems compile a data base of this position information. The database is continuously updated as the earthmoving machine modifies the site. One such system is disclosed in U.S. Pat. No. 5,493,494. The system disclosed in U.S. Pat. No. 5,493,494 displays the vehicle on a video screen to aid the operator in operation of the machine.

One of the problems encountered in such systems is determining the correct heading of the machine with respect to its course. The course of machine travel refers to the direction the machine is moving. The heading of the machine refers to the direction the front of the machine is pointing. The heading of the machine is used to display the correct course and heading of the machine to the operator.

The path of the machine is determined as a function of estimates of the machine's position. Under certain conditions it may be difficult, based solely on the position estimates, to determine whether the machine has turned or reversed directions.

One solution is to include a sensor to detect whether the transmission of the machine is in a forward gear or a reverse gear. However, addition of a sensor strictly for this purpose will add cost to the design and manufacture of the system.

The present invention is aimed at solving one or more of the problems as set forth above.

DISCLOSURE OF THE INVENTION

In one aspect of the present invention, a method for determining the relationship between the heading of a machine and the course of machine travel is provided. The method includes the steps of determining an previous course of machine travel, determining a current course of machine travel, determining a current heading corresponding to the current course, determining a filtered heading and responsively setting a direction status, comparing the previous course and current course of machine travel and responsively updated the direction status, comparing the current heading and filtered heading and responsively updating the direction status, and updating the filtered heading.

BRIEF DESCRIPTION OF THE DRAWINGS

FIG. 8 is a diagrammatic illustration of two successive courses of the machine;

BEST MODE FOR CARRYING OUT THE INVENTION

Figure 1:
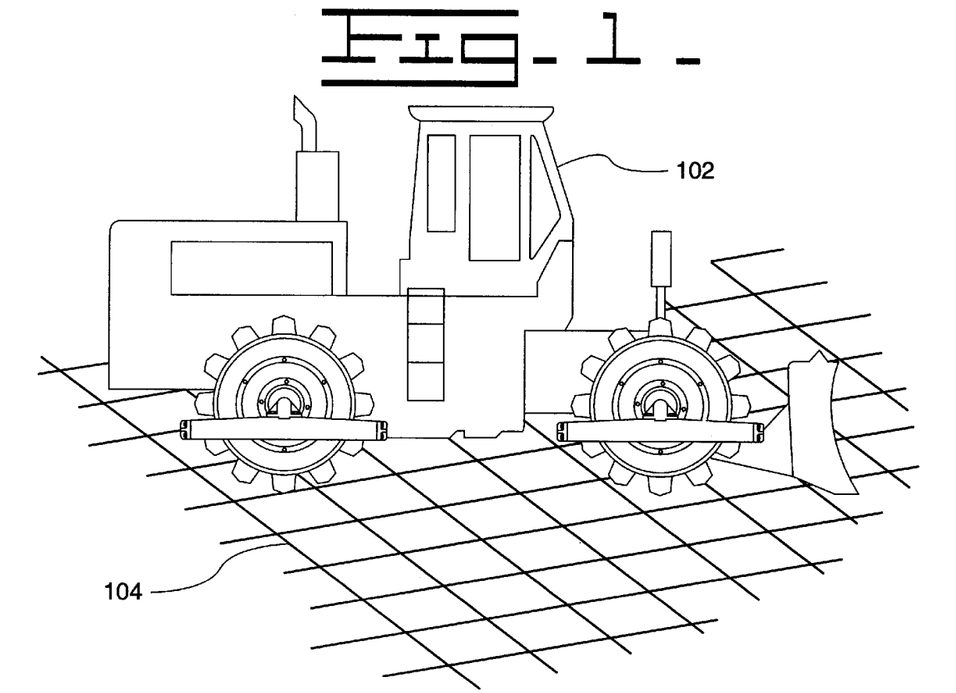
FIG. 1 is a diagrammatic illustration of an earthmoving machine operating on a work site.

With reference to FIG. 1, the present invention provides a method for determining the relationship between the heading of an earthmoving machine 102 and the course of machine travel. The course of the machine refers to the direction the machine is moving. The heading of the machine refers to the direction the front of the machine is pointing.

The earthmoving machine 102 may be manually, autonomously, or semi-autonomously operated to modify the site surface 104. The earthmoving machine 102 is shown in FIG. 1 as a compactor, although other types of earthmoving machines such as track type tractors, motorgraders, or hydraulic excavators may be substituted without departing from the spirit of the invention.

Figure 2:
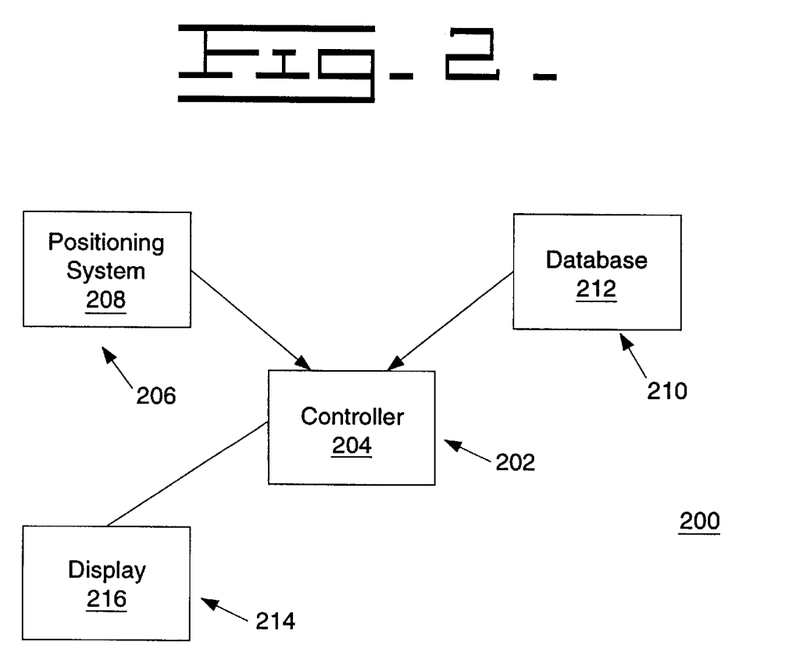
FIG. 2 is a block diagram of an apparatus for performing the present invention.

With reference to FIG. 2, the present invention is embodied in an apparatus 200. The apparatus 200 includes a calculating means 202 for determining and updating the relationship between the heading of the machine 102 and the course of machine travel, as discussed below. In the preferred embodiment, the calculating means 202 includes a microprocessor-based controller 204.

A positioning means 206 determines the position of the machine with respect to either a global reference system or a local reference system. In the preferred embodiment, the positioning means 206 includes a positioning system 208. The positioning system 208 may include any suitable positioning system, for example, a Global Positioning System (GPS), a laser plane based system or any other suitable system or combination thereof. The positioning system 208 may also include additional sensors (not shown) to enhance the accuracy of the position estimate, for example, an ultrasonic sensor located on the machine 102.

Figure 3:
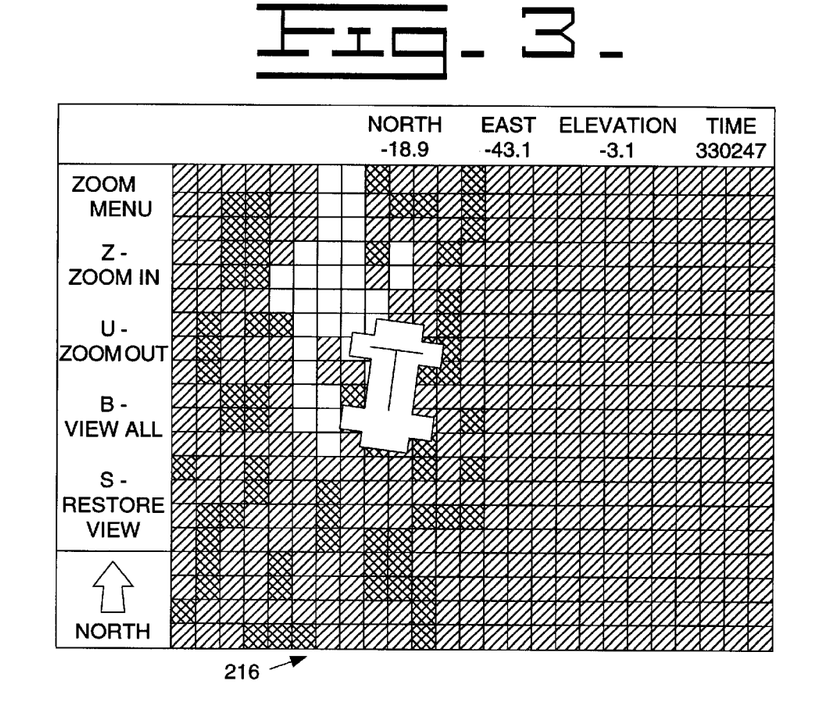
FIG. 3 is a diagrammatic illustration of a display screen for use with the present invention.

A display means 214 receives relevant information about the earthmoving machine 102 and the site surface 104 and displays the information on a display 216. For example, with respect to FIG. 3, the display 216 may be used to display the position and heading of a compactor and also a coverage monitor of the site surface 104.

As discussed below, the calculating means 202 determines the heading of the machine 102 with respect to the course of machine travel 102. Information relating to the position and heading of the machine 102 is stored in a storage means 210. Preferably, the storage means 210 includes a database 212.

A suitable system for determining the x, y, and z position of a surface and storing the elevations is disclosed in U.S. Pat. No. 5,493,494 which is incorporated herein by reference.

It should be noted, however, that although the figures illustrate a compaction machine and a coverage monitor, other earthmoving machines and information related to the site may alternately be shown. For example, the display 216 may be used to illustrate the position and heading of a track type tractor and a 3-dimensional representation of the site surface 104.

Figure 4:
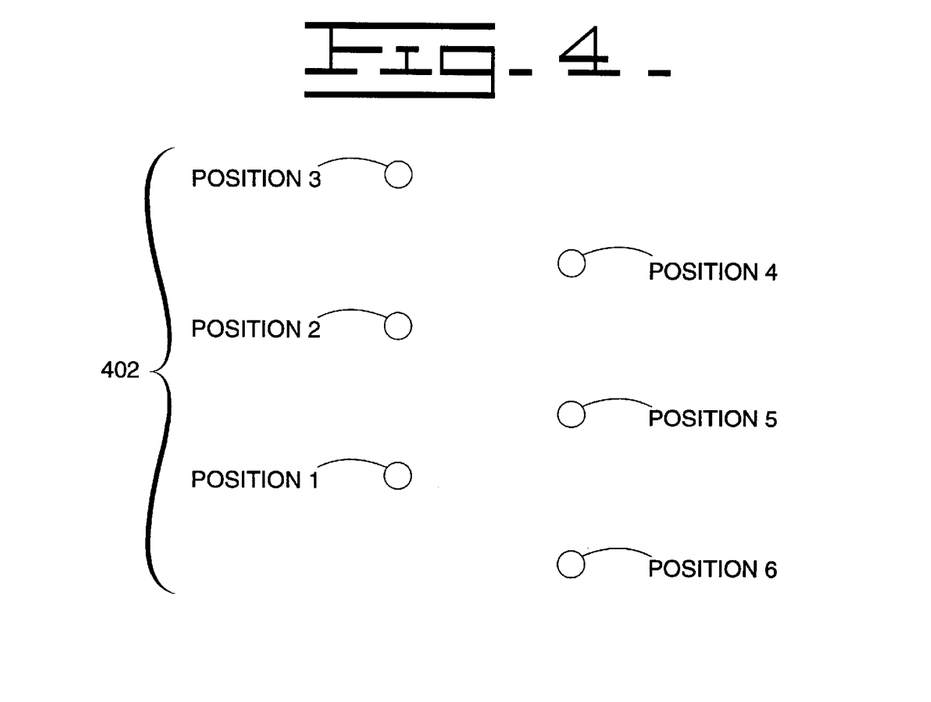
FIG. 4 is an illustration showing six successive position estimates of the machine.
Figure 5:
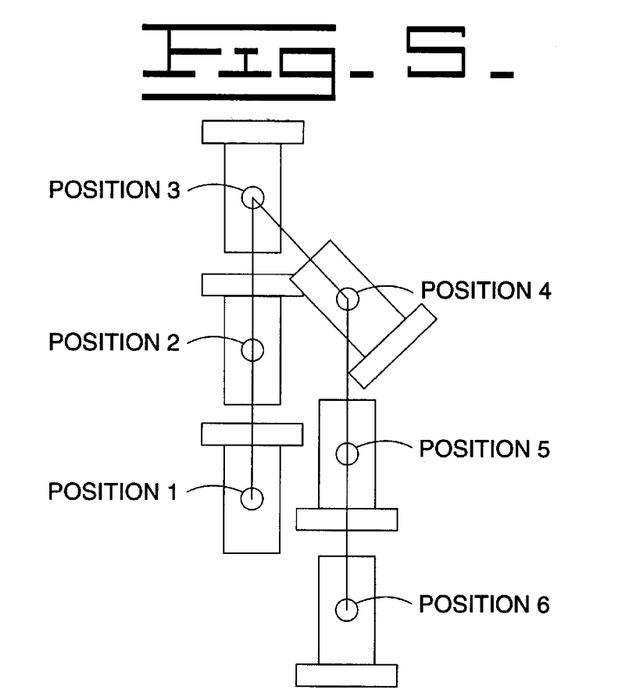
FIG. 5 is an illustration of one possible series of headings of the machine corresponding to the six position estimates of FIG. 4.
Figure 6:
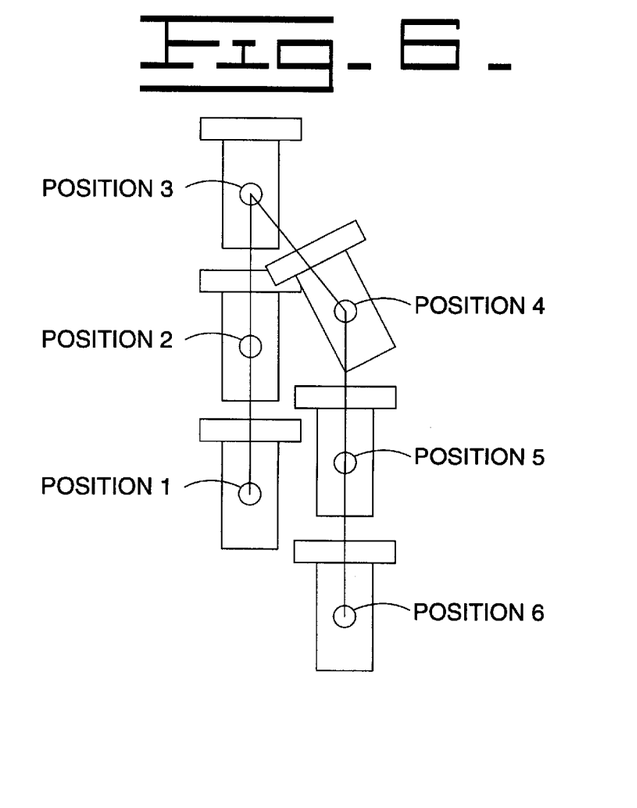
FIG. 6 is an illustration of another possible series of successive headings of the earthmoving machine corresponding to the six position estimates of FIG. 4.

With reference to FIGS. 4–6, in the preferred embodiment the present invention is used in conjunction with the display means 214. The present invention includes a method for determining the relationship between the heading of the machine and the course of machine travel. Heading is the direction the front of the machine is pointing. Course of machine travel is the direction the machine is moving. An indicator is used to represent the relationship between the heading of the machine 102 and the course of machine travel. In the preferred embodiment, the indicator is a direction status flag, or direction flag. The direction status flag has two states: Forward (F), and Reverse (R). When the heading and course of machine travel point in the same direction, the direction status flag is set to Forward. When the heading and course of machine travel point in opposite directions, the direction status flag is set to Reverse.

In FIG. 4, six successive position estimates 402 as determined by the positioning system 208 are illustrated. As shown in FIG. 5, the earthmoving machine 102 is traveling from position 1 toward position 3 and the heading of the earth moving machine 102 is in the same direction as the course of travel of the machine 102. Therefore, the direction status flag is set to Forward. However, when the earthmoving machine 102 reaches the next position estimate, position 4, the correct heading of the earthmoving machine 102 with respect to its direction of travel is unknown. There are two possibilities as illustrated by FIGS. 5 and 6. In FIG. 5, the earthmoving machine 102 has turned and the heading of the earthmoving machine 102 continues to be in the same direction as the course of travel of the machine 102. As shown in FIG. 6, the second possibility is that the machine 102 is now moving backwards, i.e., the front of the machine is now pointed opposite the direction of travel.

Figure 7:
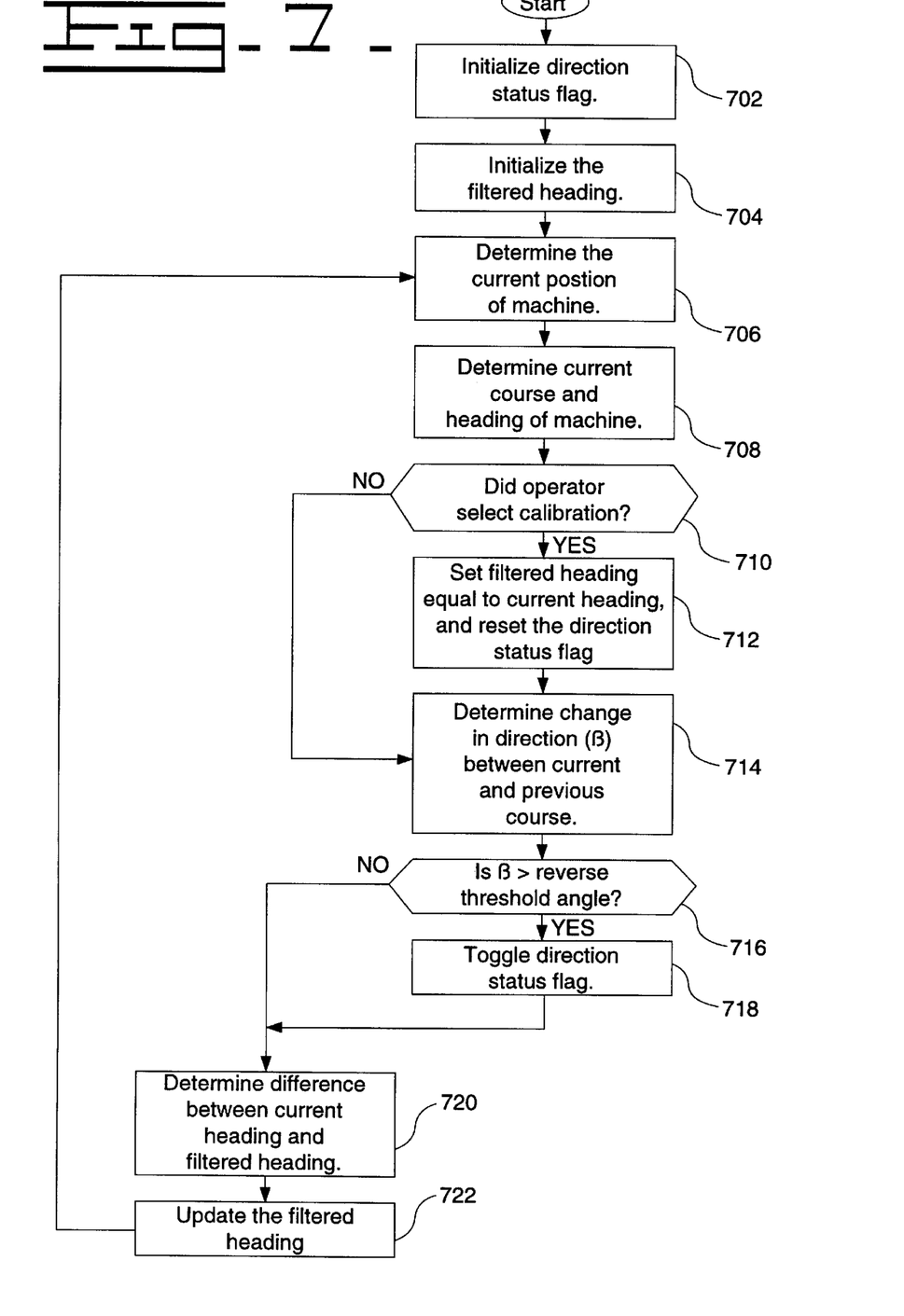
FIG. 7 is a flow diagram illustrating operation of a method for determining the relationship between the heading of the machine and the course of machine travel, according to an embodiment of the present invention.

With reference to FIG. 7, a flow diagram illustrating operation of the apparatus 200 is shown. In a first control block 702, the direction status flag is initialized. In the preferred embodiment, the direction status flag is initially set to Forward the first time the system 200 is ever turned on. After the system 200 is turned on for the first time, the state of the machine 102, including the direction status flag, is saved in the storage means 210 when the system 200 is turned off, and read in from the storage means 210 when the system 200 is turned on, in order to maintain the previous state of the machine 102. As will be discussed later, the operator of the earthmoving machine 102 may toggle the direction status flag via a calibration switch (not shown) if the assumption regarding the direction of the machine 102 is incorrect.

In a second control block 704 a filtered heading is initialized. In the preferred embodiment, there are two characterizations of heading associated with a machine 102, a filtered heading and an instantaneous, or current heading. A current course of machine travel is determined by determining a current position and previous position of the machine 102, and translating these positions into a corresponding vector, as will be discussed later. The vector determined from the current and previous positions represents the current course. The current course of machine travel is used to determine the current heading of the machine 102 by translating the vector defining the current course, into a corresponding angle defining the current heading of the machine 102. A filtered heading is determined by storing the most recent current headings and filtering them in a manner that will be discussed later. One purpose of performing the filtering of the heading is to enable accurate modeling of the motion of an earthmoving machine 102. An earthmoving machine 102 does not change direction very quickly. By filtering the current heading, the resultant filtered heading will more accurately track the motion of the machine 102. Filtering the heading also helps to minimize the impact of possible inaccuracies in the position measurements. For example, if one position measurement is substantially different from the previous measurements, the current heading and course of machine travel will be substantially different from previous determinations. The filtered heading will minimize the impact of this potential anomaly, thereby more accurately modeling the motion of the machine 102. Initially however, the assumption is that the current heading is pointing in the same direction the machine 102 is moving. Therefore, in the second control block 704, the filtered heading is initialized to be pointing in the same direction of travel as the machine 102.

In a third control block 706, the current position of the earthmoving machine 102 is determined from the positioning system 208. In one embodiment, the position of the earthmoving machine 102 is received from a GPS receiver (not shown). The GPS receiver also produces an estimate of the accuracy of the position. In the preferred embodiment the machine 102 is required to travel a minimum distance before a new position update is determined. The minimum distance required to travel is based on the accuracy of the position estimate. Requiring a minimum travel distance ensures that the earthmoving machine 102 has moved far enough from its previous location to make a useful estimate of course.

In a fourth control block 708 the current course and heading of the machine 102 are determined. In one embodiment, the current course of machine travel is determined as the vector from the previous position to the current position. In another embodiment, the course of machine travel is received from the GPS receiver. The current heading is determined by translating the current course vector into a corresponding angle.

In a first decision block 710 a determination is made as to whether a calibration flag has been set. The calibration flag is set by the operator via a calibration switch (not shown). The calibration flag enables the operator to reset the filtered heading and the direction status flag during operation of the machine 102 if desired. If the calibration flag is set, then control passes to a fifth control block 712 where the filtered heading and the direction status flag are reset. In the preferred embodiment, resetting the filtered heading is done by setting the filtered heading equal to the current heading of the machine 102. The direction status flag is reset to Forward, and then toggles between Forward and Reverse on successive calibration switch inputs. Control then passes to a sixth control block 714.

If the calibration flag has not been set, then control passes directly to the sixth control block 714. In the sixth control block 714, the change in direction ($\beta$) between the current and previous course is determined. The previous course is determined as the previous current course of travel of the machine 102. As shown in FIG. 8, the previous and current courses are represented by vectors 802, 804 respectively. The change in direction in the course is represented by the angle β as shown.

In a second decision block 716, if the angle β is greater than a predetermined reverse threshold angle, then control passes to a seventh control block 718. The reverse threshold angle indicates the maximum turning angle a machine 102 could make between two successive position updates without changing direction of motion. If the reverse threshold angle is exceeded, then the machine 102 must have changed from a Forward to Reverse direction or vice versa. The reverse threshold angle can be different for different types of machines. In the seventh control block 718, the direction status flag is toggled indicating the change in direction, and control proceeds to a eighth control block 720.

Referring again to the second decision block 716, if the angle β is less than or equal to a predetermined reverse threshold angle, then control passes directly to the eighth control block 720.

The method 700 up to this point has resulted in an initial determination regarding the relationship between the current heading and the course of travel of the machine 102. The initial determination of the relationship between the current heading of the machine 102 and the course of travel will now be verified.

In an eighth decision block 720 the current heading of the machine 102 is compared with the filtered heading of the machine 102. In the preferred embodiment, comparing the current and filtered heading of the machine involves determining a heading difference between the current heading of the machine 102 and the filtered heading.

Figure 9:
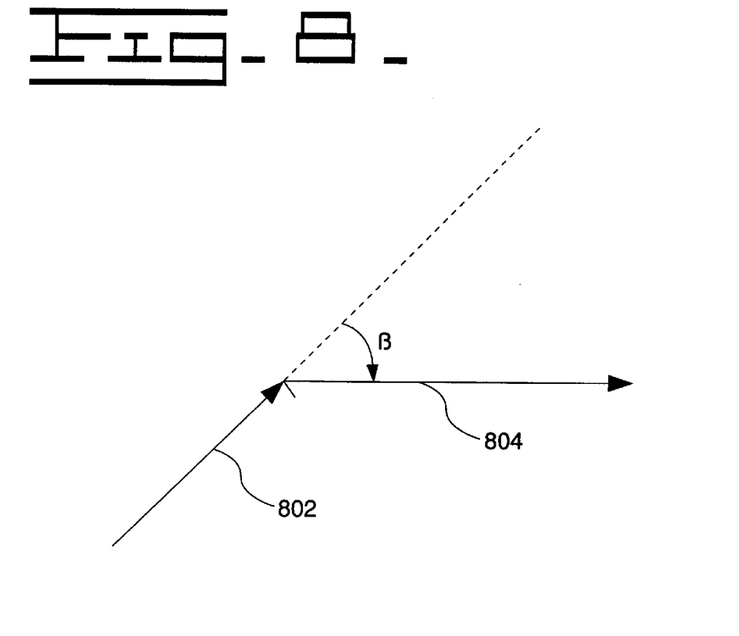
FIG. 9 is a flow diagram illustrating operation of a method for verifying the heading of the machine.

FIG. 9 expands on the eighth decision block 720 regarding the comparison between the current and filtered headings. In a first decision block 902 if the heading difference is less than or equal to the difference between 180 degrees and the reverse threshold angle, then control passes to a first control block 904. In the first control block 904, the determination is made that the heading of the machine 102 is pointed in the same direction as the course of machine travel and therefore the state of the direction status flag is Forward. The direction status flag is updated accordingly, and control is passed to a second control block 906. The angular region containing the heading difference referred to in the first control block 904 is illustrated in FIG. 10 by the angle α.

Referring again to the first decision block 902, if the heading difference is not less than or equal to the difference between 180 degrees and the reverse threshold angle, then control passes to a second decision block 908. If the heading difference is greater than or equal to the reverse threshold angle, then control passes to a third control block 910. In the third control block 910 a determination is made that the heading of the machine 102 is pointed in the opposition direction as the course of machine travel, therefore the state of the direction status flag is Reverse. The direction status flag is updated accordingly. The angular region containing the heading difference referred to in the third control block 910 is illustrated in FIG. 10 by the angle φ. Control then passes to the second control block 906.

Referring again to a second decision block 908, if the heading difference is not greater than or equal to the reverse angle, then control passes to a fourth control block 912. The angular region containing the heading difference referred to in the fourth control block 912 is illustrated in FIG. 10 by the angle θ.

Figure 10:
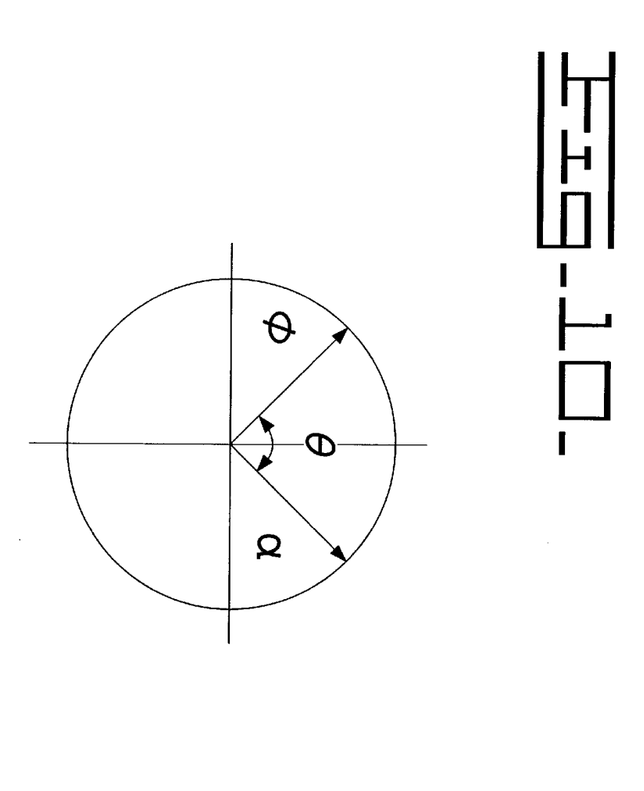
FIG. 10 is an illustration of the angular regions used to determine the heading.

As shown in FIG. 10, if control is eventually passed to the fourth control block 912, then the front of the machine 102 could be pointed in either the same direction as the course of machine travel, or opposite the course of machine travel. The heading difference θ could be either greater or less than 180 degrees divided by two. Therefore a further determination needs to be made regarding the direction of the machine.

In the fourth control block 912 a determination is made as to the relationship between the heading and course of machine travel when the heading difference lies within the angular region θ. If the heading difference is less than 180/2 degrees then the current heading of the machine 102 pointed in the same direction as the course of machine travel, otherwise the heading of the machine 102 is pointed in the opposite direction as the course of machine travel. The direction status flag is updated accordingly. Control then passes to the second control block 906.

In the second control block 906, if the direction status flag is set to Reverse, then the current heading is modified by 180 degrees so as to point in the correct direction. The purpose of adding 180 degrees to the current heading is that when the current heading is initially calculated it is based on the current course of travel of the machine 102. If the determination is made that the state of the direction status flag is Reverse, then the course of machine travel and the current heading are actually pointed in opposite directions and the current heading needs to be modified by 180 degrees to reflect the correct relationship. Therefore 180 degrees is added to the current heading.

Referring again to FIG. 7, once the heading difference is used to verify the current heading of the machine 102 in the eighth control block 720, control passes to a ninth control block 722 where the filtered heading is updated by incorporating the current heading. In the preferred embodiment the filtered heading is updated by passing the current heading through a low pass filter. One example of such a low pass filter is the following equation:

$$Filtered\ Heading=(Filtered\ Heading * Scaling\ Factor)+(Current\ Heading * (1-Scaling\ Factor))$$

In the preferred embodiment, the previous course and position are updated to equal to the current course and position in the ninth control block 722.

Control then passes to the third control block 706, and the method is repeated, continuously updating the current course, current heading, filtered heading and the relationship between the heading and the course of travel of the machine 102 throughout the operation of the system 200.

Figure 11:
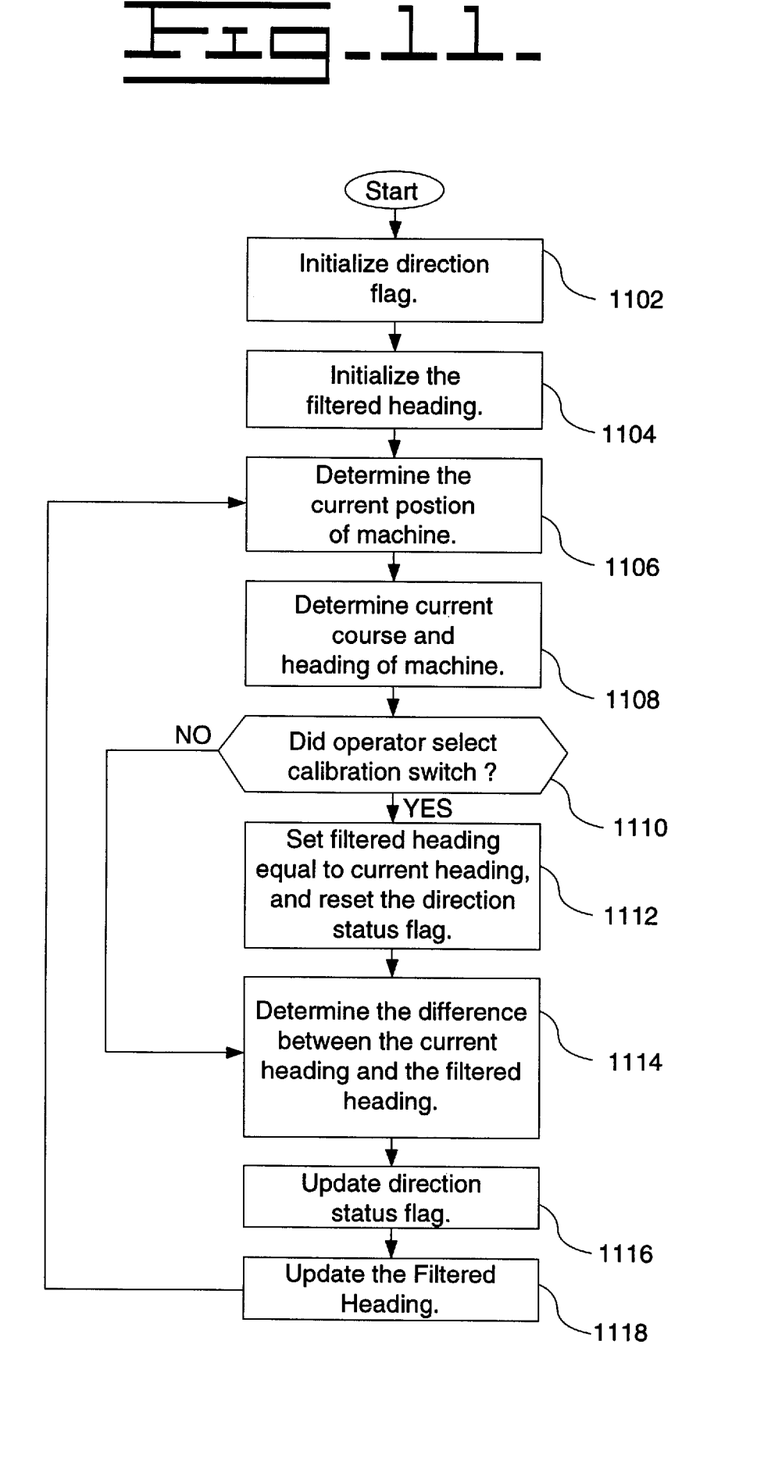
FIG. 11 is a flow diagram illustrating operation of a method for determining the relationship between the heading of the machine and the course of machine travel, according to an embodiment of the present invention.

FIG. 11 illustrates an alternative embodiment of a method for determining the relationship between the heading of a machine 102 and the course of machine travel. The method illustrated in FIG. 11 is identical to the method illustrated in FIG. 7 with the exception that three steps are deleted. These three steps deleted involve determining a change in direction (β) between the previous course and current course (the sixth control block 714), determining whether β exceeds a reverse threshold angle (the second decision block 716), and toggling the state of the direction status flag if the reverse threshold angle was exceeded (the seventh control block 718). The impact of deleting these steps is that the method illustrated in FIG. 11 determines the relationship between the heading of a machine 102 and the course of machine travel, but does not verify the relationship like the method in FIG. 7. Therefore, the method shown in FIG. 11 is a streamlined approach to determining the relationship between the heading of a machine 102 and the course of machine travel. However, the method of FIG. 7 is the preferred embodiment of the same determination due to the increased accuracy resulting from the ability to verify the relationship between the heading the machine 102 and the course of machine travel.

Industrial Applicability

With reference to the drawings and in operation, the present invention includes a method for determining the relationship between the heading of the machine and the course of machine travel. Heading is the direction the front of the machine is pointing. Course of machine travel is the direction the machine is moving. In the preferred embodiment, a direction status flag, or direction flag, is used to describe the relationship between the heading and the course of machine travel. The direction status flag has two states: Forward (F), and Reverse (R). When the heading and course of machine travel are in the same direction, the machine is moving in the forward direction, and the direction status flag is set to Forward. When the heading and course of machine travel are in opposite directions, the machine is moving in the reverse direction, and the direction status flag is set to Reverse.

Utilization of the disclosed invention will enable earth moving machines to autonomously determine the orientation of the machine as the machine traverses a path. Specifically the disclosed invention will enable a machine to autonomously determine if the heading and the course of machine travel are pointed in the same direction which will enable a determination to be made regarding the work cycle the machine. Determining the work cycle of the machine will increase the efficiency of machine as the machine performs a particular function on a work site.

The present invention may be used in a variety of applications, for example, the present invention may be used in a system which displays the current position and heading of an earthmoving machine with respect to the work site.

Other aspects, objects, advantages and uses of the present invention can be obtained from a study of the drawings, disclosure and appended claims.

I claim:

1. A method for determining the relationship between the heading of a machine and the course of machine travel, comprising:

determining a previous course of machine travel;

determining a current course of machine travel;

determining a current heading of the machine in response to said current course of the machine;

determining a filtered heading in response to at least one of an initial filtered heading and a previous filtered heading and responsively setting an indicator, said indicator being adapted to represent the relationship between the heading of said machine and the course of machine travel;

comparing said previous course and current course of machine travel and responsively updating said indicator;

comparing said current heading and said filtered heading and responsively updating said indicator, and updating said filtered heading in response to said current heading and said filtered heading.

2. A method, as set forth in claim 1, including the steps of:

determining an initial position of the machine;

determining a current position of the machine, and wherein the current course of the machine is determined as a function of said initial and current positions.

3. A method, as set forth in claim 1, wherein the step of comparing the previous course and current course of machine travel includes the steps of:

determining an angle between the current machine course and the previous machine course, and comparing said angle and a reverse threshold angle and responsively updating said indicator.

4. A method, as set forth in claim 1 wherein the step of comparing said current heading and said filtered heading include the step of determining the difference in angle between said current heading and said filtered heading and responsively generating a heading difference.

5. A method, as set forth in claim 4, including the steps of:

determining said heading difference is one of less than and equal to 180 degrees minus said reverse threshold angle, and responsively determining the heading of said machine and the course of machine travel are pointed in the same direction, and determining said heading difference is greater than 180 degrees minus said reverse threshold angle and responsively determining said heading difference is one of greater than and equal to said reverse threshold angle, and responsively determining the heading of said machine and the course of machine travel are pointed in the opposite direction.

6. A method, as set forth in claim 5, including the steps of:

determining said heading difference is one of less than and equal to 180 degrees divided by 2 and responsively determining the heading of said machine and the course of machine travel are pointed in the same direction, and determining said heading difference is greater than 180 degrees divided by 2 and responsively determining the heading of said machine and the course of machine travel are pointed in the opposite direction.

7. A method, as set forth in claim 2 including the step of setting a previous position and said previous course equal to said current position and said current course.

8. A method, as set forth in claim 1 wherein said indicator is a direction status flag, including the steps of:

setting the direction status flag to forward in response to the heading of said machine and the course of machine travel pointing in the same direction; and setting the direction status flag to reverse in response to the heading of said machine pointing in the opposite direction of the course of machine travel.

9. A method for determining the relationship between the heading of a machine and the course of machine travel, comprising:

determining a current course of machine travel;

determining a current heading of the machine in response to said current course of the machine;

determining a filtered heading in response to at least one of an initial filtered heading and a previous filtered heading and responsively setting an indicator, said indicator representing the relationship between the heading of said machine and the course of machine travel;

comparing said current heading and said filtered heading and responsively updating said indicator, and updating said filtered heading in response to said current heading and said filtered heading.

10. A method, as set forth in claim 9, including the steps of:

determining an previous position of the machine;

determining a current position of the machine, and wherein the current course of the machine is determined as a function of said previous and current positions.

11. A method, as set forth in claim 9 wherein the step of comparing said current heading and said filtered heading include the step of determining the difference in angle between said current heading and said filtered heading and responsively generating a heading difference.

12. A method, as set forth in claim 11, including the steps of:

determining said heading difference is one of less than and equal to 180 degrees minus said reverse threshold angle, and responsively determining the heading of said machine and the course of machine travel are pointed in the same direction, and determining said heading difference is greater than 180 degrees minus said reverse threshold angle and responsively determining said heading difference is one of greater than and equal to said reverse threshold angle, and responsively determining the heading of said machine and the course of machine travel are pointed in the opposite direction.

13. A method, as set forth 11, including the steps of:

determining said heading difference is one of less than and equal to 180 degrees divided by 2 and responsively determining the heading of said machine and the course of machine travel are pointed in the same direction, and determining said heading difference is greater than 180 degrees divided by 2 and responsively determining the heading of said machine and the course of machine travel are pointed in the opposite direction.

14. A method, as set forth in claim 9 including the step of setting a previous position and said previous course equal to said current position and said current course.

* * * * *